Dec. 3, 1957  R. W. FOSTER  2,815,103
AIR COOLED BRAKE SHOE
Filed March 11, 1955  3 Sheets-Sheet 1
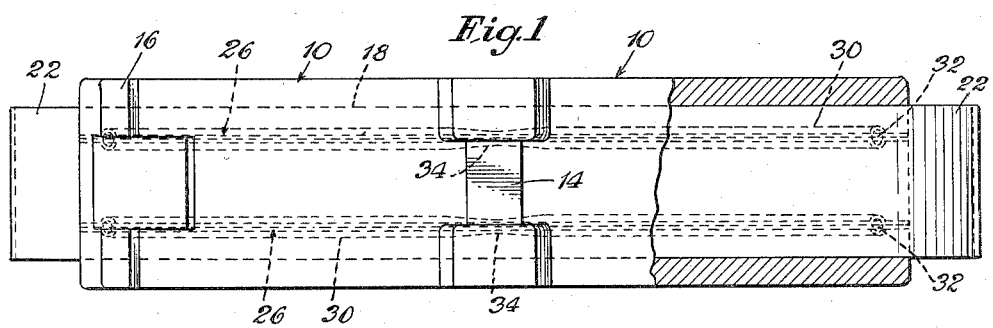
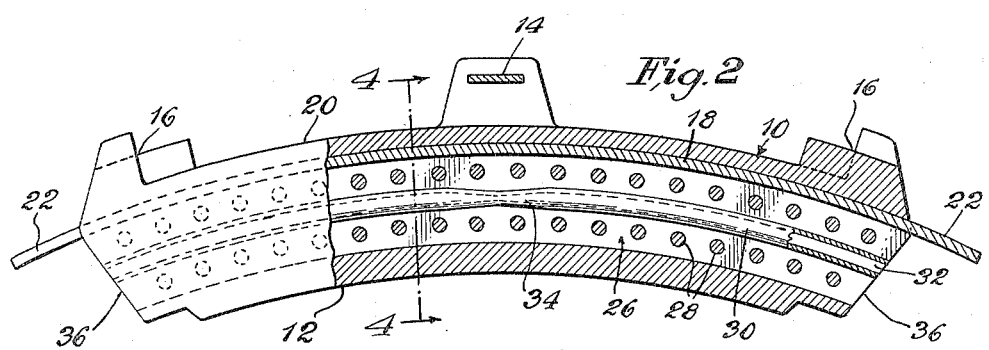
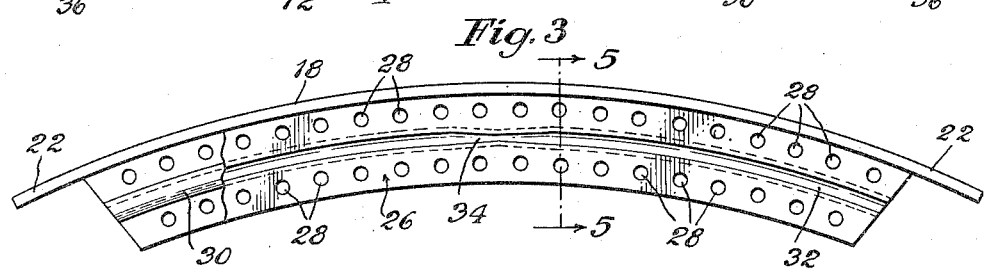
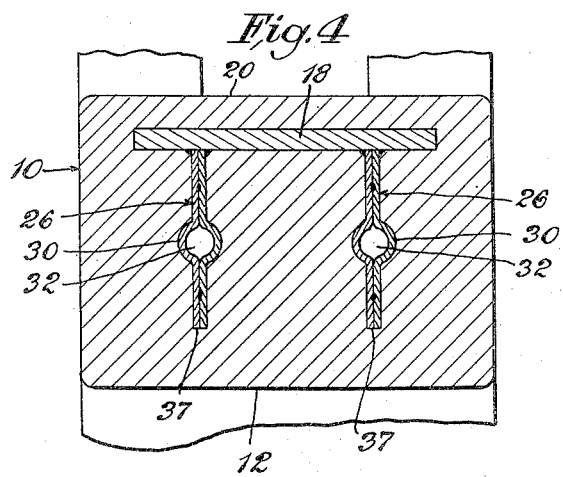
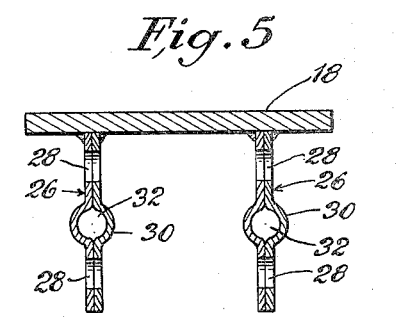
Inventor
Robert W. Foster
by Parker & Carter
Attorneys

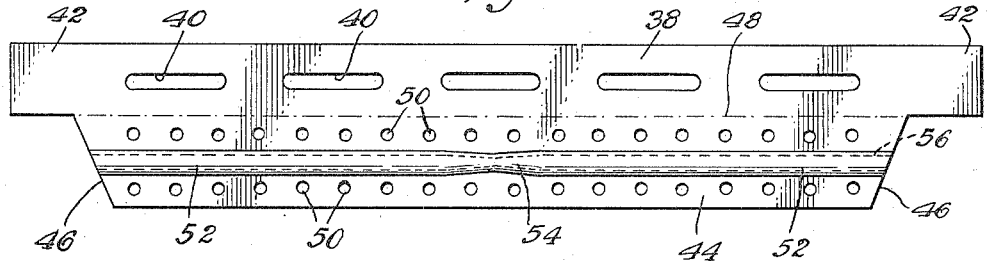
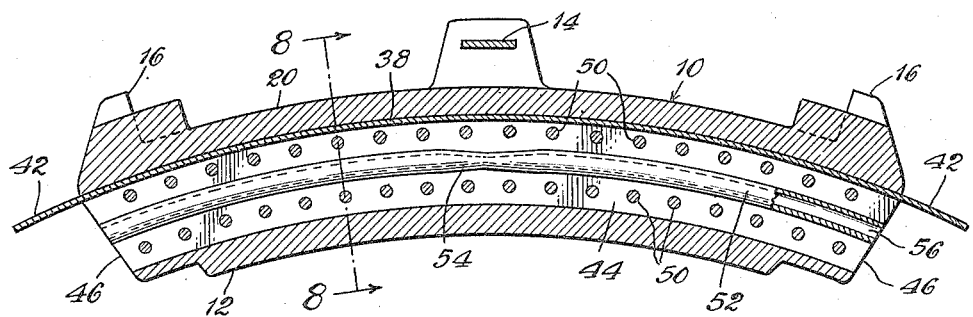
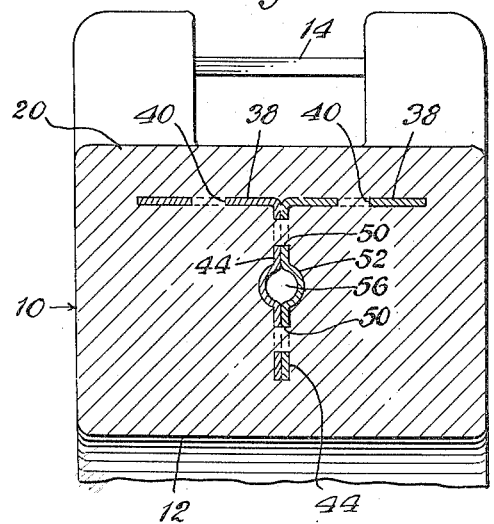
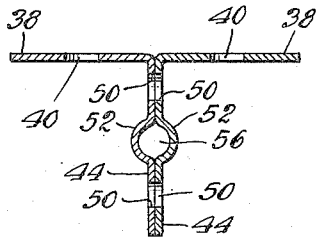

Dec. 3, 1957 R. W. FOSTER 2,815,103
AIR COOLED BRAKE SHOE
Filed March 11, 1955 3 Sheets-Sheet 3

Inventor
Robert W. Foster by Parker & Carter
Attorneys

United States Patent Office 2,815,103
Patented Dec. 3, 1957

2,815,103

AIR COOLED BRAKE SHOE

Robert W. Foster, Sullivan, Ind.

Application March 11, 1955, Serial No. 493,678

5 Claims. (Cl. 188—264)

This invention resides in the field of brake shoes for use with railroad wheels or the like and is a new and improved brake shoe of the ventilated or air-cooled type adapted to give increased mileage and improved service during its life.

A primary object of my invention is a new and improved brake shoe of the air-cooled or ventilated type having the usual back plate for supporting or reinforcing the brake shoe body throughout its length and having no reinforcing mesh or screen under, adjacent, or around the back plate.

Another object of my invention is an air-cooled or ventilated brake shoe with a reinforcing means connected or attached to the back plate and formed in unison with the longitudinal air passage or passages or ventilating means.

Another object of my invention is a brake shoe of the above type adapted to increase its contact length and area with the wheel as the face wears away.

Another object of my invention is a brake shoe of the above type with an integral reinforcing structure in the brake shoe body which does not require any type of expanded metal, wire, or mesh.

Another object of my invention is a brake shoe body with a back plate and one or more sets of paired, laterally disposed, longitudinally extending plates forming longitudinal channels or air passages which, in addition to providing for air flow through the shoe, also reinforce and support the body of the shoe so that the reinforcing mesh or expanded metal, which is conventionally used, can be eliminated.

Another object of my invention is a shoe of the above type in which the paired plates are an integral part of the back plate.

Another object of my invention is a brake shoe of the above type in which one or more channels can be used in the form of paired plates with grooves or passages through them.

Another object of my invention is a brake shoe of the above type with the ventilating or cooling passages formed integrally with the back plate.

Another object of my invention is a brake shoe of the above type with ventilated or cooling passages formed between parallel plates and adapted to extend from one side of the shoe to the other in a lateral direction.

Other objects will appear from time to time in the ensuing specification and drawings in which:

Figure 1 is a plan view, partly in section, of my new and improved brake shoe;

Figure 2 is a side view, partly in section, of Figure 1;

Figure 3 is a side view, partly in section, with parts broken away, of the brake shoe's reinforcing structure;

Figure 4 is a section taken along line 4—4 of Figure 2;

Figure 5 is a section taken along line 5—5 of Figure 3;

Figure 6 is a side sectional view of a modified form of my invention;

Figure 7 is a plan view of a blank that forms the reinforcing structure when formed;

Figure 8 is a sectional view taken along line 8—8 of Figure 6;

Figure 9 is a sectional view of the reinforcing structure;

Figure 10:
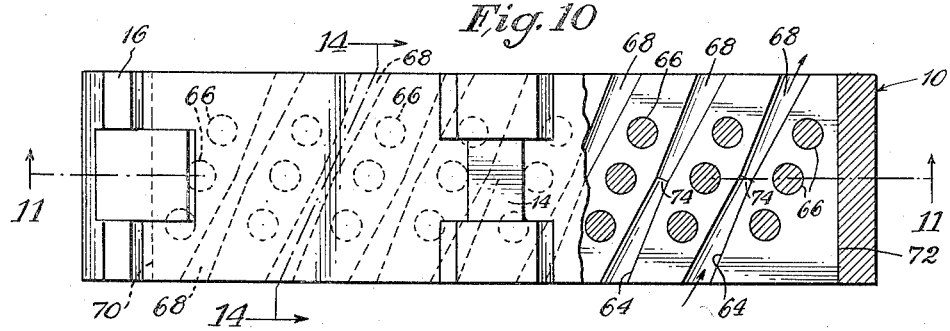
Figure 10 is a plan view, partly in section, of another form of my invention.
Figure 11:
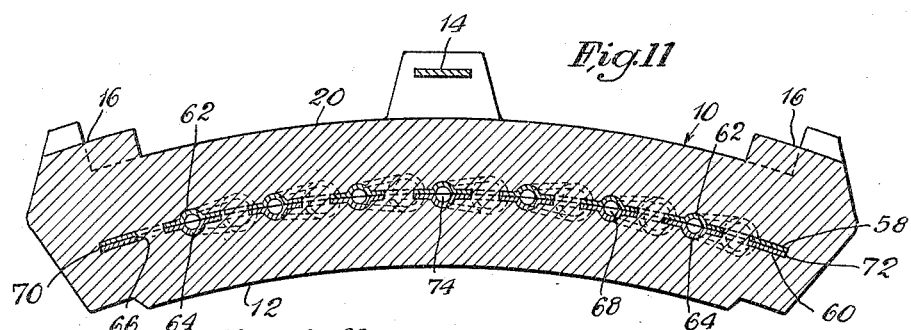
Figure 11 is a sectional view taken along line 11—11 of Figure 10.
Figure 12:
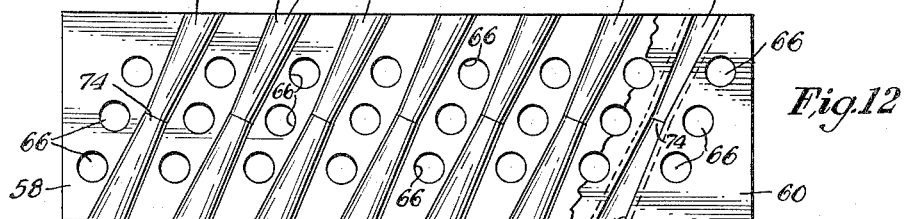
Figure 12 is a top view of the opposed plates which form the air passages and internal reinforcing structure.

In Figs. 1 and 2 I have shown brake shoe body 10 which has a wheel opposing or engaging face 12, a conventional brake hanger 14, and the usual opposed lugs 16 at each end.

A back plate 18 is embedded in the body of the shoe adjacent but below the outer or top surface 20 and projects from each end as at 22 to form air guides or scoops. One or more sets of paired plates 26, having an arcuate configuration, as shown in Fig. 3, depend from the back plate and are connected to it in any suitable manner such as by spot-welding or the like. These sets of paired plates are suitably perforated as at 28 so that metal can flow in and around them during casting. Each plate is grooved, channeled, or indented, as at 30, and are connected together in pairs by spot-welding or the like so that the grooves or channels opposed each other to form air passage 32. The paired plates extend from one end of the brake shoe body to the other so that the air passages open on each end.

Between the ends of the brake shoe body the channels or grooves are reduced in cross section as at 34 in Fig. 2 so that the air passage between the two plates has a restriction or venturi.

Both ends of the brake shoe body are under cut as at 36 so that as the shoe wears away, due to its frictional contact with the wheel, the contact area of the shoe opposed to the wheel will increase.

In Figs. 4 and 5 I have shown two such sets of plates to provide two air passages longitudinally through the shoe, although it should be understood of course that any number can be used with appropriate spacing to acquire the desired amount of cooling. The paired plates terminate adjacent but spaced from the face of the shoe, as at 37.

In Fig. 6 I have shown a modified form of the invention in which the paired plates and back plate are formed as integral parts or members. In Fig. 7 a blank is shown which has a longitudinal or main portion or section 38 suitably perforated by longitudinal slots 40 to provide for metal flow during casting with extensions or tabs 42 at each end which form the extended scoops. A side tab or flap 44 is provided and is cut back at each end at 46. This side tab is bent along the line 48 into a right angle position with relation to the main body section 38 and then the entire assembly is formed into an arcuate configuration, such as in Fig. 6, which requires that the side tab or flap 44 be appropriately stretched. Two such plates in this condition can be turned back to back and spot welded, as shown in Fig. 9, so that they will form the back plate as well as the internal reinforcing structure of the brake shoe.

The blank in Fig. 7 can be suitably perforated as at 50 at the same time that the longitudinal slots 40 are put in the body portion. Thus metal flow during casting can occur through the center piece in Figures 8 and 9. Furthermore, the side flap or tab can be suitably grooved, as at 52, with a reduced cross-sectional portion as at 54 so as to provide an air channel 56 in Figure 8 to properly cool the shoe.

Figure 13:
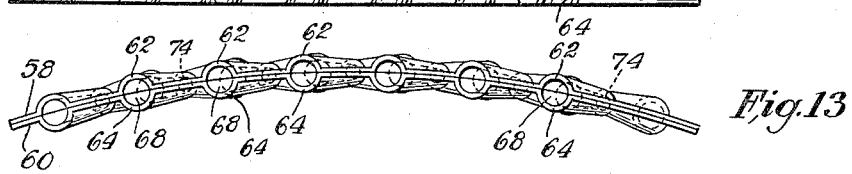
Figure 13 is a side view of the plates in Figure 12.
Figure 14:
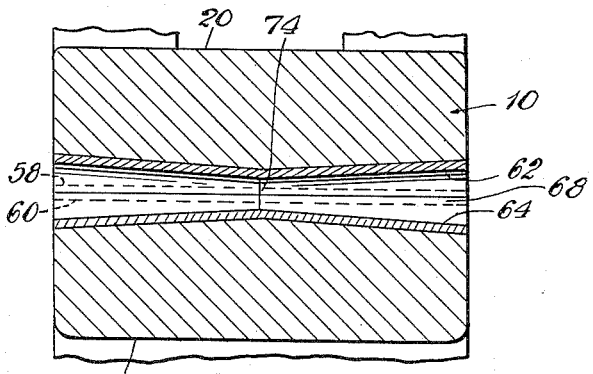
Figure 14 is a sectional view taken along line 14—14 of Figure 10.

In Figures 10 through 14 I have shown a modified form in which opposed plates are abutted and suitably secured together, the top plate being designated 58 and the bottom plate 60. The plates are disposed laterally instead of vertically as in the previous forms and each has an arcuate contour as shown in Figure 13. The top plate 58 has a suitable number of diagonal, upward grooves 62 which oppose corresponding diagonal downward grooves 64 in the bottom plate. The plates are suitably perforated with a suitable number of aligned openings 66 between the grooves so that metal can easily flow in and around the plates.

The grooves or channels in the opposed plates form air passages 68 which extend from one side of the shoe to the other, as shown in Figure 10, when the opposed plates have been imbedded in the shoe. The width of the plates is sufficient to open the air passages on each side surface of the shoe and the length is such that the plates terminate at 70 and 72 in spaced relation to the end of the shoe. The arcuate configuration of the plates is such that they conform generally to the arcuate contour of the shoe, and the plates are positioned in an intermediate position between the top and bottom surfaces of the shoe.

Each channel or air passage is formed with a reduced portion or constriction 74 between the ends to effect a venturi action approximately in the middle of the shoe to speed up the velocity of the air flow in the central plane of the shoe and to accelerate the rate of heat transfer to moving air.

The use, operation, and function of my invention are as follows:

One of the most difficult problems in manufacturing brake shoes is the casting of the shoes around the back plate and mesh. It should be understood that normal brake shoes are provided with a mesh of expanded metal, wire or the like, which is in the nature of a reinforcing medium extending from one end of the shoe to the other. As shown in my prior copending application, Ser. No. 190,970, filed October 19, 1950, now Patent No. 2,729,312, my brake shoes are provided with longitudinal channels or passages extending from one end of the shoe to the other to allow air to flow through the body of the shoe to carry away and dissipate the heat generated in the shoe due to its frictional contact with the wheel.

By the disclosed structure this channel is formed as a closed tube with flanges extending from both sides. The upper flange is either suitably secured to the back plate or is formed as an integral part of it, and the lower flange closely approaches but terminates in spaced relation to the wheel-engaging face of the shoe.

It should be noted that no expanded wire mesh, screen or the like is used, as an adequate reinforcing means is provided by the opposed plates which form or include the air passages. The plates can be suitably perforated with aligned or opposed openings of any suitable configuration so that molten metal can flow through and intertwine with the plate during casting.

In each case the passage or passages formed can be easily provided with a restriction, reduced portion, or venturi, to increase the velocity of the air flowing through the passage at a selected point to step up the heat transfer rate.

The end faces of the shoe are under-cut or slanted back so that as the face of the shoe wears away in use, the contacting surface will increase. This under-cut formation also cooperates with the scoops or extensions of the back plate to increase the air flow through the passages. Any number of paired plates could be used to provide a selected number of passages.

While I have shown the preferred form and one modification of my invention, it should be understood that numerous alterations, changes, substitutions and replacements can be made without departing from the fundamental theme. For example, the hanger in all three forms can be directly or indirectly connected to the back plate, and it should be understood that a back plate can be used in the form of Figures 10 through 14. Also in Figures 10 through 14, the hanger could be anchored in a suitable manner to the opposed plates 58 and 60, if desired. Any suitable number of passages could be provided and their spacing is not critical. The manner and disposition of the holes 66 provides for metal flow. It is important that a suitable number of holes be provided properly spaced so that a solid compact brake shoe body will result. Furthermore, two or more sets of paired plates could be used in Figures 10 through 14, one above the other in spaced relation, so that several layers of cooling passages could be provided diagonally through the shoe. The layers of perforated plates functioning additionally as the internal reinforcing structure which generally takes the form of an expanded metal or mesh. I therefore wish that my invention be unrestricted except as by the appended claims.

I claim:

1. A brake shoe for railway wheels or the like including a brake shoe body with a back plate imbedded below its upper surface, and separate but paired plates extending longitudinally and at right angles to the back plate, each plate of a pair having a longitudinal groove opposed to the corresponding grooves in the other plate of the pair between the top and bottom of the plate to form an air channel extending from end to end in the brake shoe body with portions of the paired plates both above and below the air channel.

2. The structure of claim 1 in which the paired plates are provided with a plurality of aligned lateral openings.

3. The structure of claim 1 in which the grooves in the paired plates have opposed portions reduced in cross section between the ends of the channels to form a venturi.

4. The structure of claim 1 in which the edge of the paired plates terminates in spaced relation to both the wheel confronting surface of the brake shoe body and the air channel.

5. A brake shoe for use with railway wheels or the like, comprising an elongated generally arcuate brake shoe body adapted to conform generally to the contour of a wheel, the body having an inner wheel engaging surface, a back plate below and adjacent the outer surface extending longitudinally from end to end, at least one set of separate but paired longitudinally extending, opposed reinforcing plates disposed generally at right angles to the back plate and wheel engaging surface, each set of paired plates being in engagement with the back plate on one side and terminating in adjacent but spaced relation to the wheel engaging surface, opposed grooves in the paired plates between the top and bottom of the plates forming a longitudinal air passage extending from one end of the brake shoe body to the other, with portions of the paired plates both above and below the air passage and aligned perforations in the pair plates.

References Cited in the file of this patent

UNITED STATES PATENTS

| | | |
|---|---|---|
| 685,023 | Wolhaupter | Oct. 22, 1901 |
| 1,018,209 | Reid | Feb. 20, 1912 |
| 1,065,716 | Pettis | June 24, 1913 |
| 1,907,635 | Winters | May 9, 1933 |
| 2,369,328 | Watts | Feb. 13, 1945 |
| 2,406,067 | Eurit | Aug. 20, 1946 |